United States Patent
Rueb

[19]

[11] Patent Number: 6,047,732
[45] Date of Patent: Apr. 11, 2000

[54] DIRECTIONAL CONTROL VALVE

[75] Inventor: Winfried Rueb, Lohr, Germany

[73] Assignee: Mannesmann Rexroth GmbH, Lohr, Germany

[21] Appl. No.: 09/000,498

[22] PCT Filed: May 7, 1996

[86] PCT No.: PCT/EP96/01907

§ 371 Date: Apr. 14, 1998

§ 102(e) Date: Apr. 14, 1998

[87] PCT Pub. No.: WO97/06376

PCT Pub. Date: Feb. 20, 1997

[30] Foreign Application Priority Data

Aug. 7, 1995 [DE] Germany ............................ 195 28 974

[51] Int. Cl.[7] .................................................. F16K 11/07
[52] U.S. Cl. .......................... 137/624.27; 251/73; 91/426
[58] Field of Search ......................... 137/624.27, 625.69; 251/73, 94; 91/426

[56] References Cited

U.S. PATENT DOCUMENTS

| 3,738,379 | 6/1973 | Wilke | 137/624.27 X |
| 4,336,827 | 6/1982 | Golan | 137/624.27 |
| 4,862,919 | 9/1989 | Stemmer | 137/624.27 |

Primary Examiner—Kevin Lee
Attorney, Agent, or Firm—Oblon, Spivak, McClelland, Maier & Neustadt, P.C.

[57] ABSTRACT

A directional control valve has snap-locking device for retaining the slide of the directional control valve in at least one switching position. The snap-locking device has a snap-locking part with a snap-locking piston that allows an engagement part to engage and lock the slide of the directional control valve. A kick-out device disengages the engagement part when a predetermined control pressure is exceeded. The kick-out device triggering force may be adjusted by a setting device that acts on a kick-out spring. A switching device that allows the kick-out function to be switched off independently of the setting of the setting device associated with the directional control valve in order to prevent disengagement independently of the initial stress of the kick-out spring.

31 Claims, 3 Drawing Sheets

DIRECTIONAL CONTROL VALVE

BACKGROUND OF THE INVENTION

1. Filed of the Invention

The invention concerns a directional control valve including snap-locking means for retaining the slide of a directional control valve in at least one switching position in accordance with the preamble of claim 1, and snap-locking means tor a like directional control valve.

2. Discussion of the Background

This type of valve means is utilized for example in agricultural vehicles having hydraulic auxiliary attachments. By the generic valve arrangements, a three way use is to be achieved, namely to enable conventional control of the lifting cylinder of auxiliary equipment, such as e.g. of a front loader, via the valve arrangement. Another desired use is to control other auxiliary equipment, such as e.g. a hydraulic motor via the valve arrangement, wherein the hydraulic fluid supply is controlled through the directional control valve which is to be lockable in two end positions through snap-locking means in accordance with the rotating direction of the hydraulic motor. The third use, finally, is that in particular applications the snap-locking function is to be cancelled, e.g. by being pushed out when the end position of a hydraulic cylinder is reached. This "pushing out" is commonly referred to as "kick-out". I.e., the generic valve arrangement is to enable constant latching of a valve slide of the directional control valve, cancellation of the latching engagement when a predetermined load pressure is exceeded, and a mode wherein the effect of the snap-locking means is cancelled entirely.

EP 0 394 860 B1 discloses a valve arrangement including a directional control valve and snap-locking means whereby the above mentioned triple use is provided for. To this end, there is provided in the directional control valve slide an axial bore wherein a snap-locking piston of an engagement part is received, whereby latch members may be biased in corresponding grooves of the valve housing through the peripheral wall of the directional control valve slide. Control of the snap-locking piston is carried out by means of a valve slide of a kick-out arrangement, whereby a system pressure may be supplied to the snap-locking piston in order to establish the locking engagement. When a predetermined system pressure is exceeded, a connection to a tank is opened through the slide of the kick-out arrangement, so that the pressure supplied to the snap-locking piston is relieved and the locking engagement is cancelled. The triggering force of the kick-out arrangement can be adjusted by an operator through setting means. For example, constant latching, kick-out upon exceeding a predetermined control pressure, and cancellation of engagement by adjusting a minimum triggering force may be preselected in the known valve arrangement through a corresponding adjustment of the triggering force.

Such a variation does, however, have the drawback that the slide must be provided with an axial bore for receiving the snap-locking piston, and with corresponding connection lines to the kick-out arrangement accommodated in the valve housing, whereby considerable expenses are incurred in production owing to the small dimensions of the directional control valve slide. The same is true for the components establishing the locking engagement as these have to extend through the peripheral wall of the directional control valve slide. It must be regarded another drawback of the conventional system that the operating condition in which the effect of the snap-locking means is cancelled is only possible when a corresponding triggering force ensuring immediate triggering of the kick-out arrangement is set at the kick-ut arrangement by way of the setting means. This means that in order to adjust this condition, the operator must in a most unfavorable case pass through the entire adjustment range of the setting means, i.e. the range from maximum triggering force to minimum triggering force.

Neither can the other known directional control valves comprising snap-locking means overcome the above described drawbacks.

Thus from GB-A-1227539 a valve arrangement is known wherein adjustment is only possible between constant locking engagement of the snap-locking means and a position wherein the locking engagement is cancelled. That is, a kick-out function is not provided in this known valve arrangement.

From U.S. Pat. No. 3,132,668 a valve arrangement is known wherein a kick-out function is provided, however switching between an engagement position and a position wherein the locking engagement is cancelled cannot be carried out by the operator.

SUMMARY OF THE INVENTION

In view thereof, the invention is based on the object of furnishing a directional control valve having snap-locking means for retaining a directional control valve slide and snap-locking means for a directional control valve wherein all requirements to the functions of snap-locking means are met at minimum expense in terms of device technology.

Owing to the measure of associating a switching means to the arrangement, whereby a system pressure acting in the same direction as the kick-out spring of the slide may be supplied to a slide of the kick-out arrangement, there is the possibility of overriding the control pressure applied to the slide. In this manner the kick-out function may be cancelled without any modification of the adjustment of the setting means, i.e., of the spring bias of the kick-out spring. The development of the valve arrangement in accordance with the invention thus makes it possible to disable the kick-out function without modifiying the setting means. Following subsequent activation of the kick-out function by correspondingly actuating the switching means, the kick-out arrangement is operated at its originally set kick-out spring bias. Owing to the measure of the invention, functional safety and operating facility of the valve arrangement have thus been improved quite considerably in comparison with conventional solutions.

It is particularly advantageous to mechanically couple the snap-locking piston and the slide to each other, so that upon cancellation of the locking engagement via the kick-out function the snap-locking piston is drivingly engaged by the slide and moved from its engagement position. In this variation it is therefore not necessary to cause relief of control pressure acting on the snap-locking piston such as to result in disengagement of the locking engagement, so that owing to the simple housing construction the expense in terms of production technology is considerably reduced.

Snap-locking means of this type may be employed in a directional control valve and in other applications independently from switching means.

A compact unit is obtained if the components of the valve arrangement, i.e. the engagement part, the kick-out arrangement, the setting means and the switching means are received in consecutive coaxial arrangement inside a valve housing bore. Due to this variation, a valve housing bore having only a comparatively simple construction has to be provided, whereas the directional control valve slide can be designed as a genuine piston.

The spring rate of a kick-out spring may be reduced to a minimum by designing the snap-locking piston with a smaller diameter than the slide, resulting in a piston unit having the form of a step piston. As a result of this construction the kick-out spring merely counteracts the resultant of the pressure forces acting on the front surface of the snap-looking piston and of the slide.

A valve arrangement having a particularly simple construction is obtained if the switching means is designed as a 3/2 way valve which, in a first switching position, connects the system pressure with the slide rear side, and in its second switching position relieves pressure from the slide rear side, e.g. by the latter being being connected to a tank.

A unit capable of being pre-assembled and having a particularly simple construction is obtained if the snap-locking piston and the slide are received in a common bushing which, in turn, is rotatingly received in the valve housing and constitutes a rotary slide of the switching means. In this manner the pre-assembled unit can be designed as a subassembly allowing for preliminary testing, so that production of the directional control valve in accordance with the invention is further simplified. A like subassembly suited for preliminary testing is also the subject matter of independent claim 13.

In a variation differing from the above embodiment, the bush may be provided merely for receiving slide and switching means whereas the snap-locking piston is received in a valve housing bore extending in prolongation of the bush.

In order to prevent immediate cancellation of the locking engagement in the event of pressure variations at the slide, snap-locking piston and slide can be connected to each other by a tie rod anchored in the snap-locking piston, which enters into contact with the latter only after a predetermined dead stroke of the slide, so that mechanical coupling of snap-locking piston and slide will occur only after this dead stroke.

The control pressure and the system pressure are preferably tapped by a work port of the directional control valve.

A particularly compact and simple-production unit is obtained when the axis of the snap-locking means extends approximately orthogonally relative to the axis of the directional control valve slide, so that the valve bore receiving the bushing etc. is designed as a radial bore relative to the directional control valve bore.

The biasing force cf the detent spring may be maintained at a predetermined, constant pressure if the snap-locking piston rests against a mechanical stop in its engagement position.

BRIEF DESCRIPTION OF THE DRAWINGS

Preferred embodiments of the invention shall now be explained in more detail by referring to schematic drawings, wherein.

DESCRIPTION OF THE PREFERRED EMBODIMENTS

Figure 1:
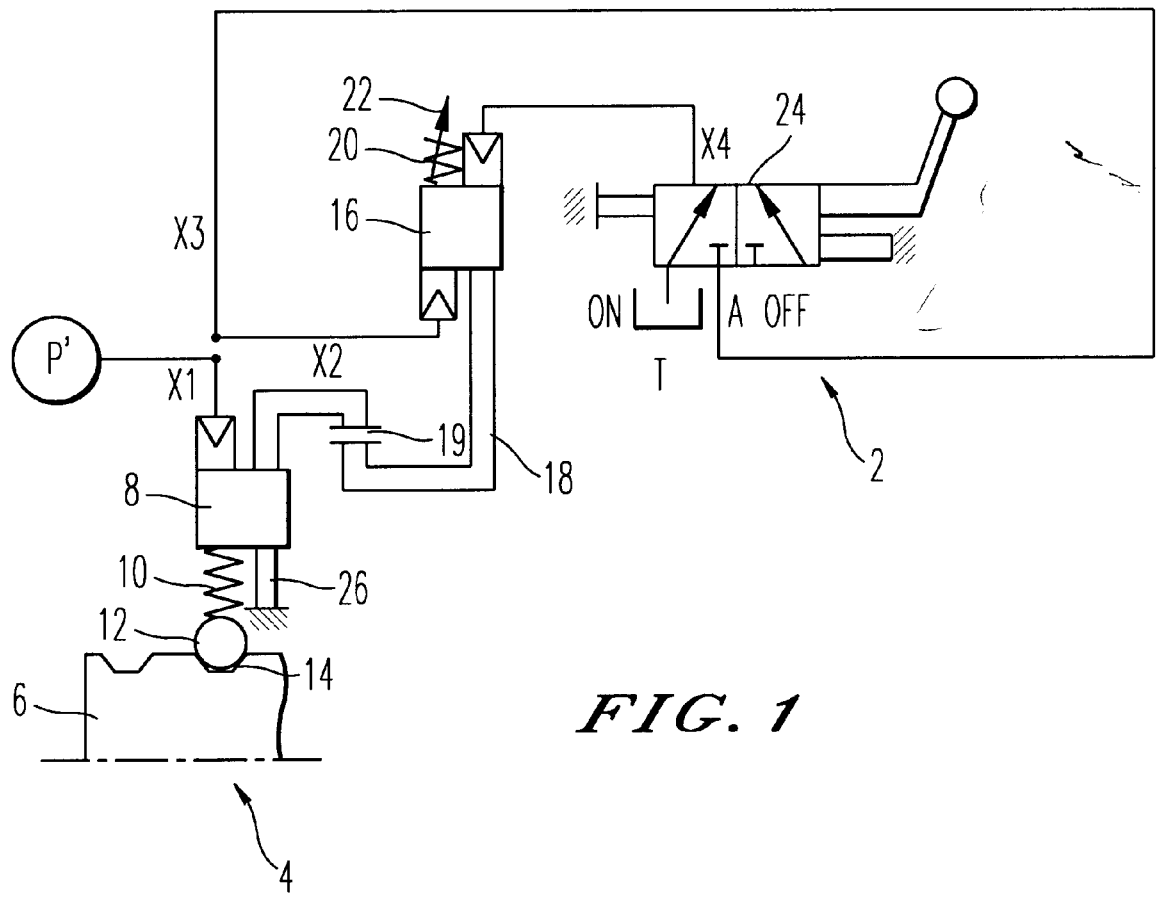
FIG. 1 shows a switching diagram of a directional control valve including snap-locking means in accordance with the invention.

FIG. 1 shows the hydraulic switching diagram of snap-locking means 2 for a directional control valve 4 of which merely the directional control valve slide 6 is indicated. Accordingly the snap-locking means 2 include an engagement part 8, the snap-locking piston of which acts, via a detent spring 10, on an engagement member, e.g. an engagement ball 12 capable of being brought into engagement with a snap-locking groove 14 of the directional control valve slide 6. Moreover the snap-locking means 2 includes a kick-out arrangement 16, the slide of which is mechanically connected through coupling means 18 to the snap-locking piston of the engagement part 8. The coupling means 18 comprise e.g. a tie rod which contacts a stop 19 following a dead stroke, whereafter the snap-locking piston is drivingly engaged.

For controlling the engagement part 8 and the kick-out arrangement 16, a control pressure p1 is guided through a port of the directional control valve 6 and, via control pressure lines $X_1$, $X_2$, to the one front side of the snap-locking piston of the engagement part 8 facing away from the detent spring 10, or to the opposite front side of the slide of the kick-out arrangement 16. The other front side of the slide of the kick-out arrangement 16 is biased by means of a kick-out spring 20 whose bias is adjustable with the aid of setting means 22. Moreover from the spring side of the kick-out slide another control line $X_4$ is routed to a 3/2 way valve acting as switching means 24.

In a first switching position a, the switching means 24 connect the control line $X_4$ to a tank T while a port A is closed. The control pressure p' is supplied to port A via a control line $X_3$.

In the second switching position b, the tank port T is closed while the control lines $X_3$ and $X_4$ are connected to each other, so that the control pressure p' is applied to the spring side of the kick-out slide. The control pressure p' is also guided via control lines $X_1$ and $X_2$ to the opposing front sides of the snap-locking piston (engagement part 8) and of the kick-out slide. In switching position b, the control pressures p' applied to both front sides of the kick-out slide thus about cancel each other out, so that the kick-out slide is constantly biased into its engagement position by the kick-out spring 20. Moreover the control pressure p' acts via the control line $X_1$ on the snap-locking piston 8, so that the latter is pressed against a stop 26, whereby the detent spring 10 is biased with a predetermined spring force to push the engagement ball 12 into the snap-locking groove 14. Because in the switching position b of switching means 24 the kick-out slide 16 is always biased into its engagement position (in a downward direction in FIG. 1), the kick-out function is disabled in this switching position as long as a control pressure p' is applied.

Upon manual displacement of the slide of the switching means 24 in the switching position a, the control line $X_4$ is connected to the tank T, so that the spring side of the kick-out slide no longer receives the control pressure p' and is biased into its engagement position by nothing but the action of the detent spring 10. When a predetermined control pressure p' in the control line $X_2$ is exceeded, the kick-out slide is displaced against the action of the detent spring 10, with the movement of the kick-out slide 20, following contact with the stop 19, being transmitted through the coupling means 18 to the snap-locking piston of the engagement part 8T so that the latter moves away from the stop 26. Hereby the spring bias of the detent spring 10 is cancelled, so that the engagement ball 12 is disengaged from the snap-locking groove 14 and the snap-locking function is cancelled. I.e., in switching position a of the switching means 24, the kick-out function of the snap-locking means 2 is determined by the bias of the kick-out spring 20.

In this variation it is not required to provide a control pressure line providing for return of the snap-locking piston when a threshold pressure is exceeded to the snap-locking piston of the engagement part 8.

The snap-locking function may finally be disabled altogether by reducing the bias of the kick-out spring 20 to a minimum by means of the setting means 22, so that the snap-locking piston is constantly pulled out of its engagement position by means of coupling means 18 and kick-out slide.

Direct coupling of snap-locking piston and kick-out slide provides for a circuit exhibiting excellent responsivity while having a simple construction.

In a variation of the embodiment shown in FIG. 1, a remote control may also be provided instead of manually operated switching means 24, so that the kick-out function may be enabled or disabled by way of a system control etc..

Figure 2:
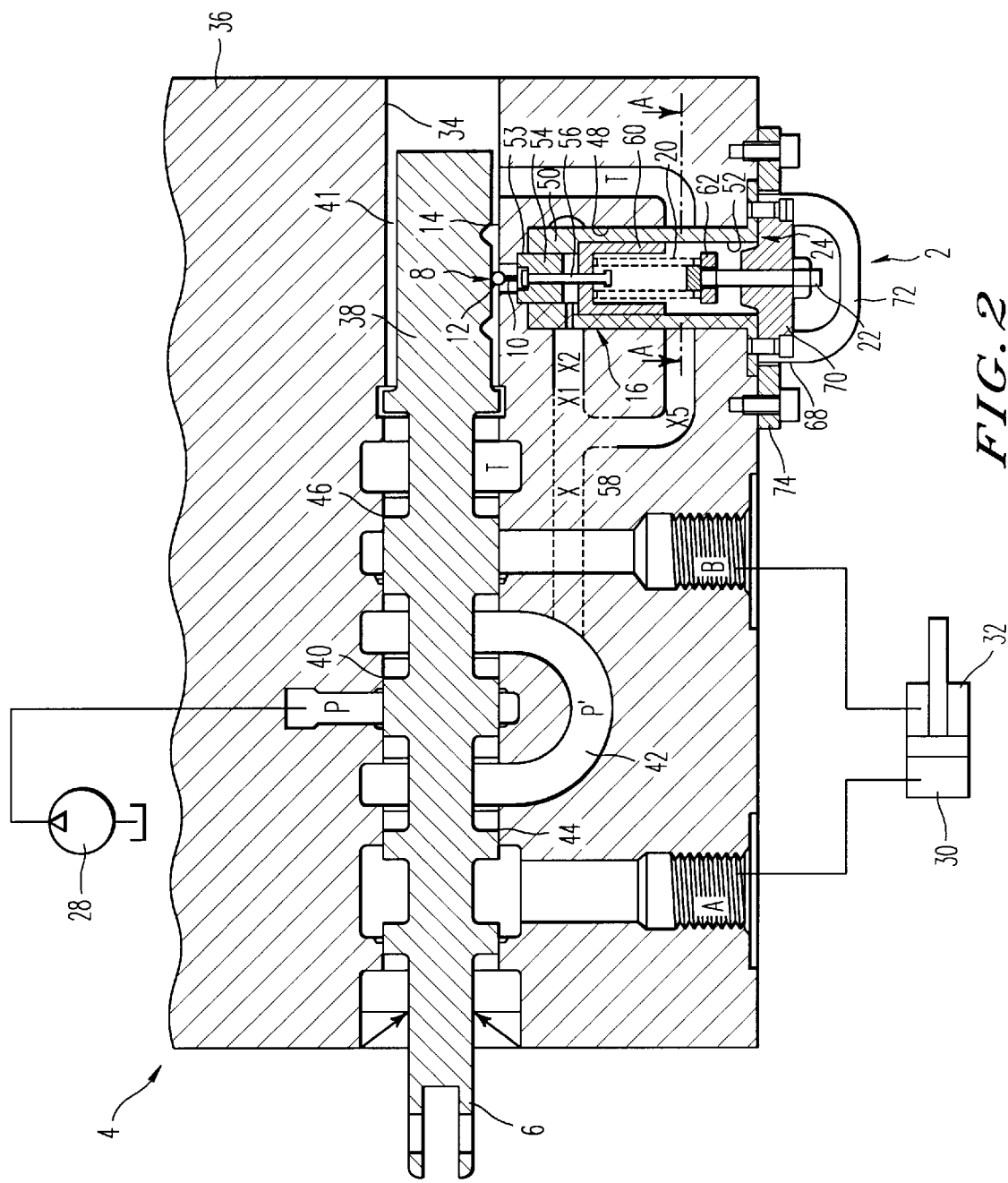
FIG. 2 shows a specific embodiment of a directional control valve including snap-locking means in accordance with FIG. 1.

FIG. 2 shows a specific embodiment of a directional control valve 4 having snap-locking means 2.

In the shown embodiment, the directional control valve 4 has the form of a 4/3 way valve whose port P is supplied with a pump pressure by pump 28.

The work ports A and B are connected to consumers, with one lifting cylinder being represented in the shown embodiment. The work ports A and B are connected to the cylinder bottom side 30, or to the cylinder rod side 33 of the work cylinder, so that the cylinder volumes 30, 32 may alternatingly be supplied with hydraulic fluid for displacement of the reciprocating piston. The respective other cylinder volume (30 or 32) may be connected to a tank, port T, so that upon a corresponding piston displacement, the hydraulic fluid present in the diminishing cylinder volume can be relieved via the tank T.

The directional control valve slide 6 is guided in a valve bore 34 of a valve housing 36, with the directional control valve slide 6 being biased into its neutral position shown in FIG. 2 by return springs which are not represented, and being displaceable into its switching positions by means of displacement means which are not represented.

An end portion of the directional control valve slide 6 positioned on the right side in FIG. 2 projects into an end portion 38 of the valve bore 34, with the diameter of the end portion 38 being smaller than the diameter of the valve bore 34 in this portion, resulting in a ring gap 41.

At the end portion 38 two axially spaced-apart snap-locking grooves 14 are formed whereby the directional control valve slide 6 may be locked in those two switching positions in which the work port A or the work port B are connected with the lifting cylinder A description of the various annular spaces of the valve housing 36 and of the annular grooves of the directional control valve slide 6 can be omitted in this description as it is not of importance for the function of the snap-locking means.

By displacing the directional control valve slide 6 from its shown neutral position towards the left (view of FIG. 2) a connection between the pump port P and a connecting passage 42 is opened via a control edge 40, and via a control edge 44 a connection from the connecting passage 40 to control port A is established, so that hydraulic fluid is applied to the cylinder bottom side 30. Simultaneously a connection between the tank port T and the work port B is controlled open by a control edge 46, so that the cylinder rod side 32 is connected with the tank T.

On the other hand, upon a displacement of the directional control valve slide 6 towards the right in FIG. 2, the connection between the pump port P and the work port W is controlled to be open so that hydraulic fluid is applied to the cylinder rod side 32, while the cylinder bottom side 30 is connected to the tank port T via the work port A.

In these two end switching positions of the directional control valve slide 6, the engagement b3d 12 of the snap-locking means 2 engages the right-hand or left-hand snap-locking groove 14 at the end portion 38 of the directional control valve slide 6, so that upon corresponding bias of the engagement ball 12, the directional control valve slide 6 is immobilised in the respective end position.

In the representation of FIG. 2 the snap-locking means 2 has the form of a module-type valve arrangement having a longitudinal axis which extends orthogonally to the axis of the valve slide. The entire snap-locking means 2 is received in a transverse bore 48 of the valve housing 36, In the embodiment shown ir FIG. 2 the transverse bore 48 is reduced in a step configuration in a direction towards the valve bore 34, with a bushing 50 being rotatingly received in the expanded portion of the transverse bore 48.

The bushing 50 in turn includes a guiding bore 52 reduced in a step configuration towards the valve bore 34, with the reduced guiding bore portion 52 having the same diameter as the reduced portion of the transverse bore 48 which extends in prolongation of the guiding bore 52.

In this reduced portion of the guiding bore 52, the snap-locking piston 54 of the engagement part 8 is guided; the front side of the engagement part 8 having an upper position in FIG. 2 supports the detent spring 10 which in turn biases the engagement ball 12 towards the end portion 38 of the directional control valve slide 6. In the base position (engagement position) shown in FIG. 2, the snap-locking piston 54 contacts a shoulder 53 of the transverse bore 48, whereby the spring bias of the detent spring 10 is limited.

Moreover in the snap-locking piston 54 a tie rod 56 is fastended which has a coaxial arrangement with the axis of the transverse bore, and whose one end portion facing away from the detent spring 10 freely projects from the snap-locking piston 54 and is provided with an engaging collar 58.

In the radially expanded portion of the guiding bore 52 a cup-shaped slide 60 of the kick-out arrangement 16 is guided, the front side of which is penetrated by the tie rod 56, so that the radially expanded engaging collar 58 is received in the cavity of the slide 60. The latter is biased by the kick-out spring 20 towards the radial shoulder of the guiding bore 52, with the kick-out spring 20 being supported on the internal front side of the slide 60. The other side of the kick-out spring 20 contacts a spring cup 62 arranged at an axial distance with from the internal front side of the slide 60; This distance may be adjusted through setting means 22 designed as a threaded bolt and screwed into a housing part 70 which is stationary in the axial direction. I.e., the spring bias of the kick-out spring 20 may be varied by adjusting the setting means 22.

The engaging collar 58 is arranged at an axial distance from the internal front side of the slide 60 in its represented starting position, so that upon a downward axial displacement of the slide 60 in the representation according to FIG. 2 the latter enters into contact with the engaging collar 58 only following a predetermined axial displacement.

FIG. 2 moreover shows that the snap-locking piston 54 and the slide 60 are positioned an axial distance from each other in the starting condition, so that these two components define a cylinder volume into which the control line $X_1$, $X_2$ having the form of a radial throttling port in the bushing 50 opens. The control line $X_1$, $X_2$ opens into a connecting bore X through which the supply pressure p' in the connecting passage 42 may be tapped. This supply pressure p' substantially corresponds to the work pressure prevailing at the ports A, B of the directional control valve 4. The connecting bore X is in the range of the transverse bore 48 expanded into an annular space enclosing the transverse bore and thus the bushing 50 in the peripheral direction. A control line $X_5$ which is connected to the bushing 50 at an axial distance from control line $X_1$, $X_2$ branches off from the connecting bore X.

At the diametrically opposite side of the bushing 50 another connection line is formed in the valve housing 36, thereby establishing a connection to the tank T.

Figure 3:
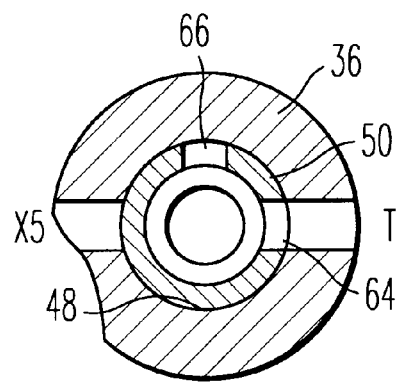
FIG. 3 is a sectional view along line A—A in FIG. 2.

FIG. 3 shows a sectional view of the bushing 50 along line A—A in FIG. 2. It shows that two radial bores 64, 66 arranged at right angles to each other are formed in the bushing 50 which is rotatingly received in the transverse bore 48; of these, the first radial bore 64 extends in the shown rotary position of the bushung 50 in prolongation of the tank port T, whereas the second radial bore 66 is arranged orthogonally with respect to the first radial bore 64 and is closed by the peripheral wall of the transverse bore 48 in the shown switching condition.

Upon a 90° counterclockwise rotation of the bush 50 in FIG. 3, the second radial bore 66 is oriented with respect to control line $X_5$ while the first radial bore 64 is closed.

Therefore, in accordance with the switching position of the bushing 50, the spring side of the slide 60 is on the one hand connected to the tank T (switching position of FIG. 3) or, in the other switching position, to the control line $X_5$, so that the throttled supply pressure, which is also supplied to the space between snap-locking piston 54 and slide 60 via the control line $X_1$, $X_2$, is supplied to the spring side of the slide 60.

At the front side of the bush 50 positioned below in FIG. 2, a mounting flange 68 is formed to which a covering yoke 70 is fastened and through which the threaded rod of the setting means 22 extends. The covering yoke 70 carries a handle 72 whereby the bushing 50 may be rotated into its two switching positions about an angle of approximately 90°.

Instead of the handle 72, intervention is also possible by corresponding remote-controlled actuating means operated e.g. by electromotor or hydraulically. The rotary bushing 50 is immobilized in the axial direction in the valve housing 36 by means of axial fittings 74, with the axial fittings 74 naturally admitting the rotary movement of the bushing 50.

In the embodiment illustrated the bushing 50 thus acts as a rotary disk slide of a turning valve, whereby the spring side of the slide 60 of the kick-out arrangement 16 may optionally be connected with a tank T or to the system pressure p'.

In the position represented in FIG. 3, the kick-out function of the kick-out arrangement 16 is governed by the spring bias of the detent spring 20, whereas in the other switching position (second radial bore 66 oriented with respect to control line $X_5$) the kick-out function is disabled.

The triggering force of the kick-out arrangement is preselected through corresponding adjustment of the setting means 22 and thus of the spring bias of the kick-out spring 20 biasing the slide 60 towards the radial shoulder of the guiding bore 52. Upon corresponding displacement of the directional control valve slide 6, the engagement ball 12 engages one of the snap-locking grooves 14, with the snap-locking piston being pressed against the shoulder 53 by the system pressure supplied by the control line $X_1$, $X_2$, so that the detent spring 10 is biased correspondingly.

When a predetermined system pressure is exceeded, the biasing force of the kick-out spring 20 is overcome, so that the slide 60 is pushed in a downward direction in the representation according to FIG. 2. Following a predetermined axial displacement the internal front side of the slides 60 enters into contact with the engaging collar 58, so that the snap-locking piston 54 is withdrawn from its engagement position, so that the engagement ball 12 disengages and the directional control valve slide 6 is again freely movable.

The kick-out pressure S required for triggering the kick-out arrangement is calculated in accordance with the formula:

$$S = F_{KO} \cdot \frac{4}{(D_2^2 - D_1^2) \cdot \pi}$$

wherein $F_{KO}$ is the spring force while $D_2$ is the diameter of the slide 60, and $D_1$ is the diameter of the snap-locking piston 54.

It can be taken from this formula that owing to the step-shaped formation of the piston arrangement (slide 60, snap-locking piston 54) a kick-out spring 20 having a comparatively low spring constant can be used inasmuch as the forces and pressures to be controlled are small.

The entire snap-locking means 2, substantially consisting of the rotating bushing 50 and the components guided therein (slide 60, snap-locking piston 54, setting means 22 etc.), ran be designed as a subassembly suited for preliminary testing which can be mounted and tested independently from the directional control valve.

As the return movement of the snap-locking piston 54 is effected through the tie rod 56 and the axial displacement of the slide 60, a separate control pressure bore for effecting this return of the snap-locking piston 54 need not be provided—this allows for minimized work expense in manufacturing the directional control valve.

Another advantage of the above described embodiment consists in the extremely simple structure of the transverse bore 48 which has a simple geometry and a small axial length and may therefore be produced in the form of a reamed bore. Due to the low spring forces ($F_{KO}$), mounting and maintenance during operation are very simple as special tools are not required for biasing.

Figure 4:
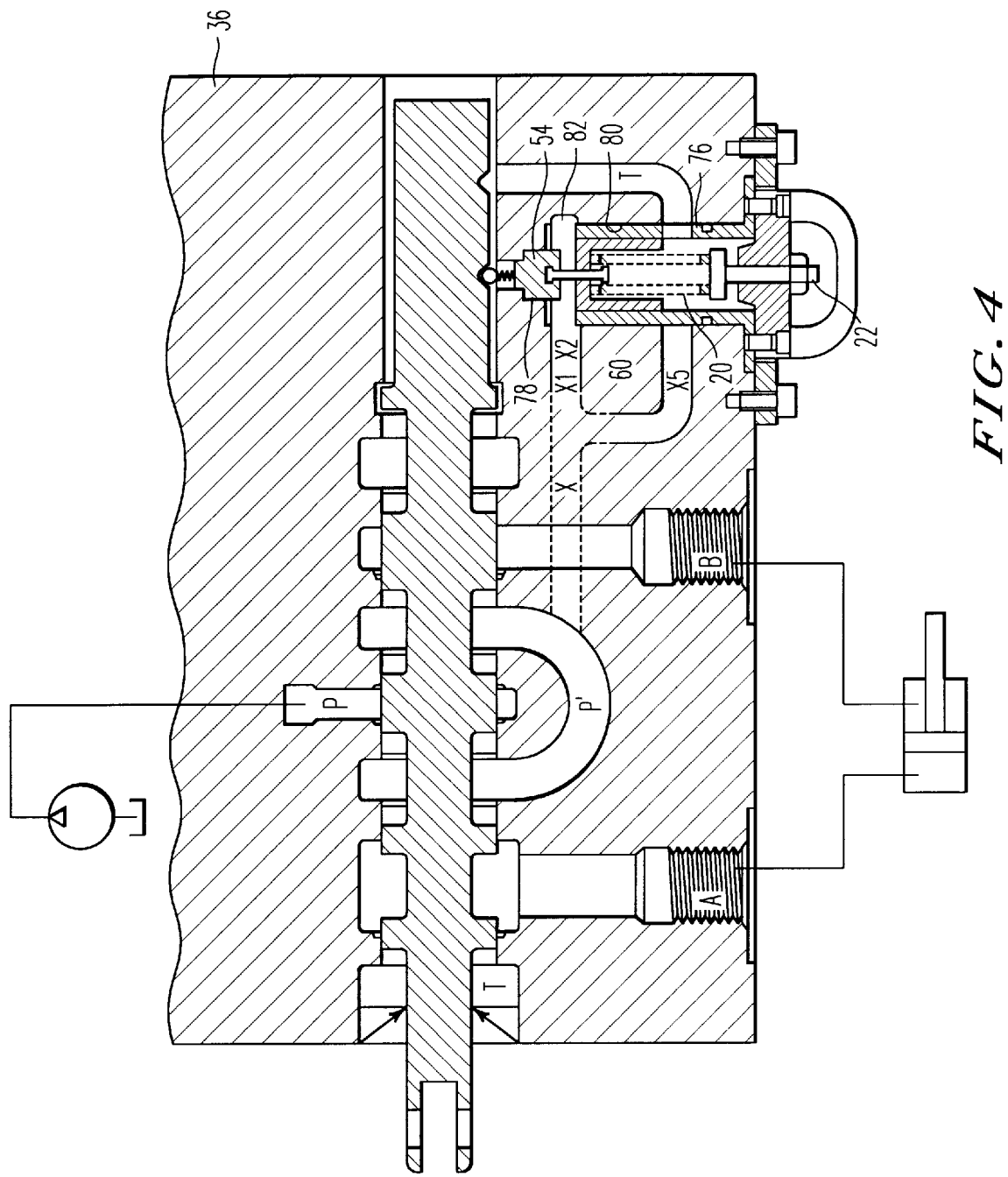
FIG. 4 shows another specific embodiment including modified snap-locking means.

FIG. 4 shows another embodiment of a directional control valve 4 including snap-locking means 2 in accordance with the invention.

This embodiment essentially differs from the embodiment of FIGS. 2 and 3 in the configuration of the bush and of the transverse bore.

All other components largely conform with the above described embodiment, so that a description thereof may be omitted. Analogous components are designated by identical reference symbols in FIGS. 2 and 4.

Other than in the above described embodiment, the bushing 76 acting as a rotary slide is designed with a smaller axial length, so that the snap-locking piston 54 is guided not in the bushing 50 any more, but only in a reduced transverse bore portion 78 extending in prolongation of a radially expanded transverse bore portion 80. In this radially expanded transverse bore portion 80 the bushing 76 is rotatably received, with a control line $X_5$ and a tank line T again being connected to its peripheral wall.

Inside the bushing 76, in turn, the slide 60 of the kick-out arrangement is guided which may be biased in the same manner as for the above described embodiment through the setting means 22 and the kick-out spring 20. The two transverse bore portions 78 and 80 each open into an annular space 82 formed in prolongation of the control line $X_1$, $X_2$.

Moreover in this embodiment the directional control valve slide 6 is immobilized by the snap-locking means 2 in its represented neutral position, however the selection of the engagement position is, of course, performed at will, so that in the same manner as in the above described embodiment the engagement positions can be allocated to the two end positions of the directional control valve slide.

The embodiment represented in FIG. 4 comprises a bushing 76 with a somewhat simpler construction inasmuch as it need not be formed with the step-shaped reduction for receiving the snap-locking piston 54. On the other hand this variation presents the drawback that the snap-locking means 2 can only be pre-assembled as a unit suited for preliminary testing at a higher expense, because guiding of the snap-locking piston 54 is performed by the valve housing 36 of the directional control valve.

Its function corresponds to the one of the above described embodiments, so that a redescription thereof may be omitted.

Both variations share the advantage that the kick-out function of the valve arrangement may be disabled without modifying the spring bias of the kick-out spring 20. In addition, owing to the axial arrangement of engagement part 8, kick-out arrangement 16, setting means 22 and switching means 24, expense in terms of device technology and required space are minimal.

Processing of the housing is very simple, whereby the production costs can also be reduced to a minimum. Moreover the development of the switching means 74 in accordance with the invention allows for remote control which permits a higher degree of automation of the device.

As the snap-locking piston and the slide are mechanically coupled to each other, there is no need to provide control lines for actuation of the snap-locking piston,

I claim:

1. A directional control valve, which comprises:
   snap-locking means for retaining a slide of a directional control valve in at least one switching position, the snap-locking means including an engagement part having a snap-locking piston for biasing an engagement member into an engagement position by means of a detent spring, and including a kick-out arrangement having a kick-out spring and including a slide to which a control pressure is applicable for cancelling a locking engagement of the engagement member, the kick-out arrangement including setting means for adjusting said kick-out spring and by which a triggering force for the kick-out arrangement is presetable, and
   switching means by which a system pressure counteracting the control pressure is communicable to the slide so that the slide, independently of the setting position of the setting means, remains in a position associated with the engagement position of the snap-locking piston.

2. The directional control valve according to claim 1, wherein the snap-locking piston and the slide are mechanically coupled to each other.

3. The directional control valve according to claims 1 or 2, which comprises a housing having a bore wherein the snap-locking piston, the slide, the setting means and the switching means are received in said bore of said housing in a coaxial arrangement.

4. The directional control valve according to claim 3, wherein a diameter dimension of the snap-locking piston is smaller than that of the slide, and wherein the system pressure is supplied to mutually adjacent front sides of the snap-locking piston and of the slide.

5. The directional control valve according to claim 3, wherein the switching means comprises a 3/2 way valve which, in a first switching position, relieves pressure from the slide rear side and in a second switching position supplies the system pressure to the slide rear.

6. The directional control valve according to claim 5, which comprises a bushing wherein the slide and the setting means are guided in said bushing which, in turn, is rotatably mounted in the housing and forms a rotary slide of the directionally control valve.

7. The directional control valve according to claim 6, wherein the snap-locking piston is also guided in said bushing.

8. The directional control valve according to claim 2, wherein the snap-locking piston and the slide are connected through a tie rod which is fastened in the snap-locking piston and which comprises an engaging collar positioned an axial distance from a stop surface of the slide so that said slide, following a predetermined dead stroke, is contactable with the engaging collar.

9. The directional control valve according to claim 4, wherein the control pressure and the system pressure are substantially equal to the system pressure prevailing at a work port of the directionally control valve.

10. The directional control valve according to claim 1, wherein an axial displacement of the snap-locking piston and the slide is orthogonal to the axial displacement of the directional control valve slide.

11. The directional control valve according to claim 1, wherein the snap-locking piston is biased towards a mechanical stop through the control pressure.

12. The directional control valve according to claim 1, wherein the switching means is actuatable by remote control.

13. Snap-locking means for a directional control valve according to claim 1, which comprises an engagement part having said snap-locking piston for enabling biasing of said engagement member into an engagement position by means of a detent spring wherein the snap-locking piston and the slide are coupled to each other through a tensile connection.

14. The snap-locking means according to claim 13, wherein the snap-locking piston has a smaller diameter than the slide and includes a control pressure port such that a control pressure is communicable to the mutually adjacent front sides of the slide and the snap-locking piston, wherein the kick-out spring acts on the front side of the slide facing away from the snap-locking piston and to which setting means for adjusting the spring bias are associated.

15. The snap-locking means according to claim 14, wherein said switching means is arranged such that the system pressure counteracting the control pressure is supplied to the spring side of the slide, and wherein the snap-locking piston, the slide, the setting means and a setting member of the switching means are positioned in a common valve bore.

16. A directional control valve, which comprises:
   a snap-locking device for retaining a slide of a directional control valve in at least one switching position, the snap-locking device including an engagement part having a snap-locking piston for biasing an engagement member into an engagement position by means of a detent spring, and including a kick-out arrangement having a kick-out spring and including a slide to which a control pressure is applicable for cancelling a locking engagement of the engagement member, the kick-out arrangement including a setting device for adjusting said kick-out spring and by which a triggering force for the kick-out arrangement is presetable, and a switching device by which a system pressure counteracting the control pressure is communicable to the slide so that the slide, independently of the setting position of the setting device, remains in a position associated with the engagement position of the snap-locking piston.

17. The directional control valve according to claim 16, wherein the snap-locking piston and the slide are mechanically coupled to one another.

18. The directional control valve according to claims 16 or 17, which comprises a housing having a bore wherein the snap-locking piston, the slide, the setting device and the switching device are received in said bore of said housing in a coaxial arrangement.

19. The directional control valve according to claim 18, wherein a diameter dimension of the snap-locking piston is smaller than that of the slide, and wherein the system pressure is supplied to mutually adjacent front sides of the snap-locking piston and of the slide.

20. The directional control valve according to claim 18, wherein the switching device comprises a 3/2 way valve which, in a first switching position, relieves pressure from the slide rear side and in a second position supplies the system pressure to the slide rear side.

21. The directional control valve according to claim 20, wherein the slide and the setting device are guided in a bushing which, in turn, is rotatably mounted in the housing and forms a rotary slide of the directionally control valve.

22. The directional control valve according to claim 21, wherein the snap-locking piston is also guided in the bushing.

23. The directional control valve according to claim 17, wherein the snap-locking piston and the slide are connected through a tie rod which is fastened in the snap-locking piston and which comprises an engaging collar positioned an axial distance from a stop surface of the slide so that the latter, following a predetermined dead stroke, is contactable with the engaging collar.

24. The directional control valve according to claim 19, wherein the control pressure and the system pressure are substantially equal to the system pressure prevailing at a work port of the directional control valve.

25. The directional control valve according to claim 16, wherein an axial displacement of the snap-locking piston and the slide is orthogonal to the axial displacement of the directional control valve slide.

26. The directional control valve according to claim 16, wherein the snap-locking piston is biased towards a mechanical stop through the control pressure.

27. The directional control valve according to claim 16, wherein the switching device is actuatable by remote control.

28. A snap-locking device for a directional control valve according to claim 16, which comprises an engagement part having said snap-locking piston for enabling biasing of said engagement member into an engagement position by a detent spring, wherein the snap-locking piston and the slide are coupled to each other through a tensile connection.

29. The snap-locking device according to claim 28, wherein the snap-locking piston has a smaller diameter than the slide and includes a control pressure port such that a control pressure is communicable to the mutually adjacent front sides of the slide and the snap-locking piston, wherein the kick-out spring acts on the front side of the slide facing away from the snap-locking piston and to which a setting device for adjusting the spring bias is associated.

30. The snap-locking device according to claim 29, wherein said switching device is arranged such that the system pressure counteracting the control pressure is supplied to the spring side of the slide, and wherein the snap-locking piston, the slide, the setting device and a setting member of the switching device are positioned in a common valve bore.

31. The snap-locking means according to claim 4, wherein the switching means comprises a 3/2 way valve, which, in a first switching position, relieves pressure from the slide rear side and in a second switching position supplies the system pressure to the slide rear side.

* * * * *